No. 618,520.  H. PADDOCK.  Patented Jan. 31, 1899.
EXCESS BAGGAGE SCALE.
(Application filed Feb. 23, 1898.)

(No Model.)  2 Sheets—Sheet 1.

WITNESSES:  INVENTOR

No. 618,520. Patented Jan. 31, 1899.
H. PADDOCK.
EXCESS BAGGAGE SCALE.
(Application filed Feb. 23, 1898.)

(No Model.) 2 Sheets—Sheet 2.

WITNESSES: Hamlin Paddock. INVENTOR

Frank O. French
W. H. Sargent.

BY
C. S. Sturtevant
ATTORNEY.

THE NORRIS PETERS CO., PHOTO-LITHO., WASHINGTON, D. C.

UNITED STATES PATENT OFFICE.

HARVLIN PADDOCK, OF ST. JOHNSBURY, VERMONT, ASSIGNOR TO THE E. & T. FAIRBANKS & COMPANY, OF SAME PLACE.

EXCESS-BAGGAGE SCALE.

SPECIFICATION forming part of Letters Patent No. 618,520, dated January 31, 1899.

Application filed February 23, 1898. Serial No. 671,274. (No model.)

*To all whom it may concern:*

Be it known that I, HARVLIN PADDOCK, a citizen of the United States, residing at St. Johnsbury, in the county of Caledonia, State of Vermont, have invented certain new and useful Improvements in Excess-Baggage Scales, of which the following is a description, reference being had to the accompanying drawings and to the letters of reference marked thereon.

My invention relates to an improvement in weighing-scales; and the object is to provide a scale for the use especially of baggage-masters on railroads, whereby the actual weight as well as the excess over the amount usually carried free is readily indicated. It is the custom of almost all railroads to carry a certain amount of baggage—as, for instance, one hundred and fifty pounds—free upon a passenger's ticket, while any excess of that weight is charged for at so much per hundred, and considerable delay is caused in weighing and then calculating the amount to be charged where the ordinary platform-scales are used.

My invention consists of a platform-scale whereon a dial-pointer is connected with the levers, said dial containing rows of figures indicating, respectively, the gross weight and the excess weight, and, if desired, a third row of figures may be added indicating the price to be charged for the excess.

Figure 1:
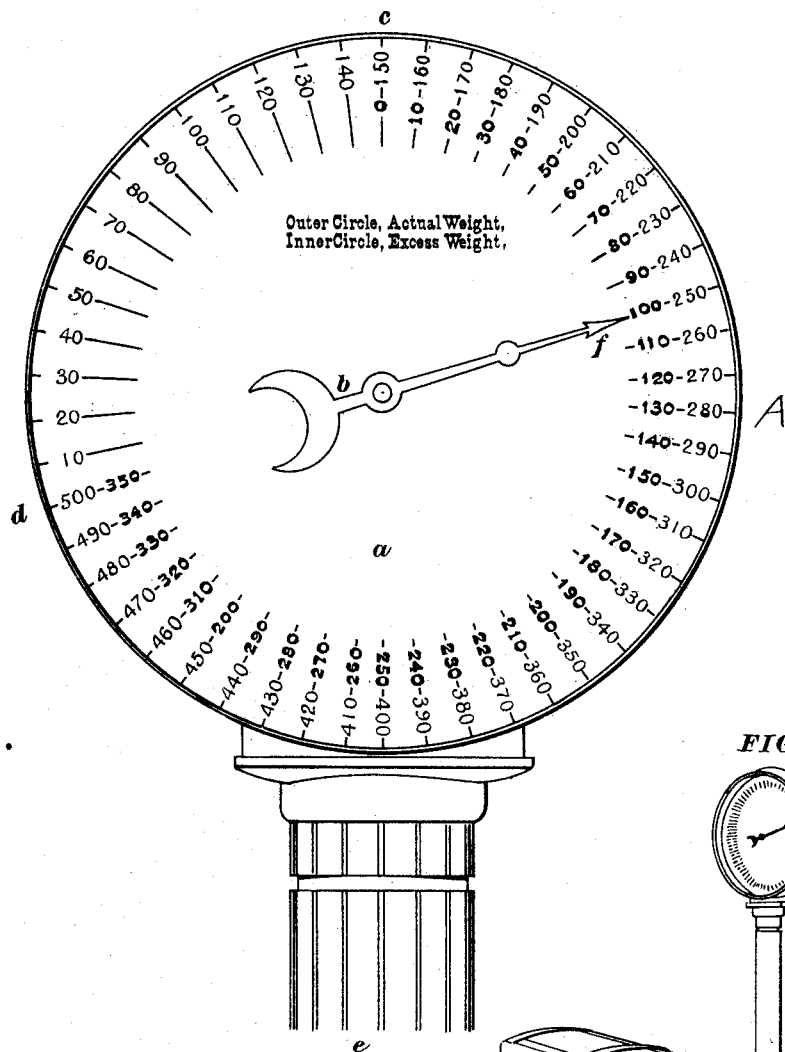
Figure 2:
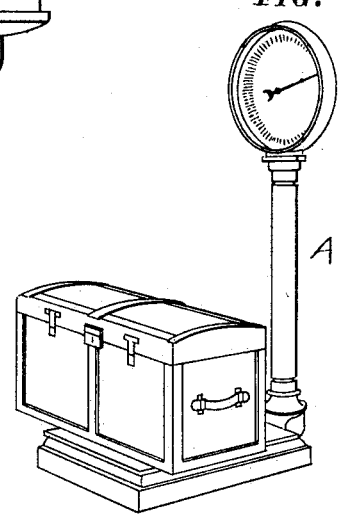
Figure 3:
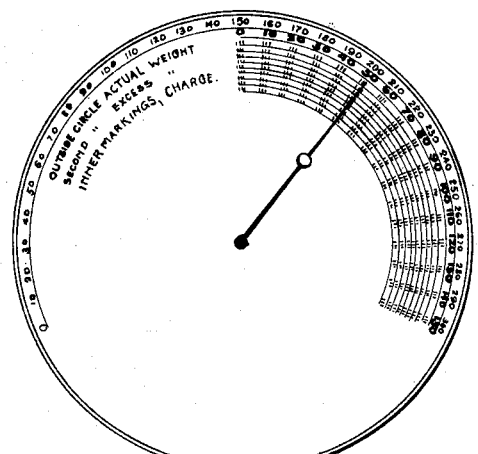
Figure 4:
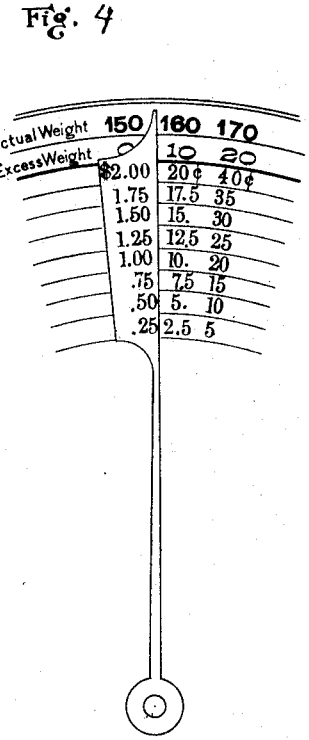

In the accompanying drawings, which illustrate the invention, Figure 1 is a front view of a portion of a platform-scale, showing my invention applied thereto. Fig. 2 is a perspective view illustrating my invention. Fig. 3 is a view similar to Fig. 1, showing the dial as provided with the additional feature of the row of figures indicating the price to be charged for the excess. Fig. 4 is an enlarged detail view showing the rates marked on the dial-hand, from twenty-five cents to two dollars; and Fig. 5 shows the rates fixed on the face of the dial.

In the drawings, A represents a platform-scale of ordinary construction provided with a spring gravity-arm or other device for rotating a pointer and provided with a dial $a$, mounted upon the standard of the scale and having rotatably mounted on its face a pointer $b$, connected with the scale-levers. The face of the dial $a$ is graduated, as herein shown, to indicate pounds from "10" up to "500," while commencing at "150" is an inner row of figures running from "0" up to "350," these figures representing the difference between the gross weight of the article of baggage and the weight of the amount usually carried free, which in this instance is one hundred and fifty pounds. It will thus be seen that when an article is placed on the platform of the scale its gross weight and excess weight will be indicated at a glance.

Figure 5:
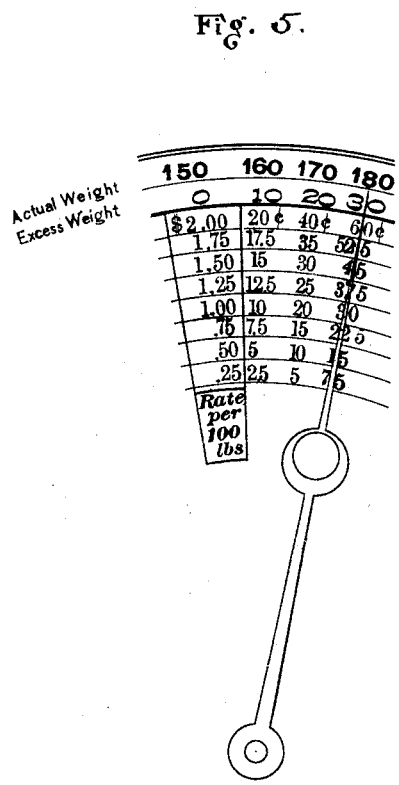

As shown in Figs. 3, 4, and 5, rows may be provided indicating the amount to be charged for the excess. In Fig. 4 the dial hand or pointer has a widened upper portion upon which is fixed the rate per hundred pounds, from twenty-five cents up to two dollars, while in Fig. 5 the rate per hundred pounds is indicated on the face of the dial itself. The figures on the spaces opposite the rates show the amounts to be charged. For example, as shown in Fig. 4, at an excess rate of two dollars per hundred pounds the charge for a ten-pound excess would be twenty cents.

Having thus described my invention, what I claim as new, and desire to secure by Letters Patent, is—

1. A scale for baggage-masters to indicate actual weight and excess weight, comprising a dial provided on the face with rows of regularly-progressing numerals or figures indicating actual weight, and a second row of regularly-progressing numerals or figures registering with the first row to indicate excess weight and beginning with its zero-mark at the numeral or figure of the outer series which indicates the limit of weight to be carried free, a single pointer operating with both rows of figures and operatively connected with the scale-levers; substantially as described.

2. A scale for baggage-masters, to indicate actual weight, excess of weight and the price for such excess, comprising a dial provided on its face with an outer circular series of regularly-progressing figures or numerals indicating actual weight, an inner concentric series of regularly-progressing numerals registering with those of the outer series to indicate excess weight and beginning with its zero-mark under that numeral or figure of the outer series which indicates the limit of weight to be carried free, and concentric rows of price-numerals registering with the excess-indicating numerals to indicate the price of such excess weight, and a single pointer operating in connection with all of said series of numerals and operatively connected with the scale-levers, substantially as described.

3. The herein-described scale for baggage-masters, provided with a dial having a circular series of regularly-progressing numerals indicating actual weight, an inner concentric series of regularly-progressing numerals registering with those of the first series to indicate excess weight; the zero-mark of the excess series registering with that numeral or figure of the first series which indicates the limit of weight to be carried free, an innermost series of numerals indicating the price for such excess and registering with the excess-weight numerals, and a pointer operatively connected with the scale-levers, operating in connection with all of said series of numerals and provided with the rate charges for excess weight; substantially as set forth.

In testimony whereof I affix my signature in presence of two witnesses.

HARVLIN PADDOCK.

Witnesses:
PERLEY F. HAZEN,
J. M. CADY.